UNITED STATES PATENT OFFICE 2,373,015

PROCESS FOR PRODUCING POLYMERIC MATERIALS

John C. Cowan and Waldo C. Ault, Peoria, Ill., assignors to Claude R. Wickard, as Secretary of Agriculture of the United States of America, and to his successors in office No Drawing. Application February 24, 1942, Serial No. 432,126

8 Claims. (Cl. 260—399)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to polymeric substances and is directed more particularly to a method of producing high molecular weight polymerization products from substances containing fat acid radicals and to the products obtained thereby.

It is common practice in the oil industry to impart highly desirable properties to oils of the glyceride type by subjecting them to heat treatments known as bodying processes. In the course of such treatments polymerization of the oil occurs, the degree of polymerization varying with operating conditions and with the oils being used. The polymerization of fatty oils is due to the presence in the oils of certain constituents containing radicals of unsaturated acids. The more common examples of such polymerizable acids are those containing two or more double bonds, such as the octadecadienoic acids containing two double bonds, for instance linoleic acid, and the octadecatrienoic acids containing three double bonds, such as linolenic and eleostearic acids.

It is known that in the thermal polymerization of fatty oils such as for example tung, linseed, corn, cottonseed, sunflower seed, soybean, dehydrated castor oil and the like, the polymerization takes place by intermolecular attachments at the double bonds, yielding mixtures of polymeric products. However, due to the fact that in the fatty oils the unsaturated fat acid radicals (which may also be designated as unsaturated acyl radicals) are usually present in the form of glycerides, the formation of polymers having very high molecular weights was always undesirable because these highly polymerized products are insoluble gels. These gelled substances are composed of a large percentage of solid material which upon saponification, hydrolysis and re-esterification with a monohydric alcohol such as methanol, yield liquid esters. Analysis of these liquid esters of monohydric alcohols shows them to consist almost entirely of monomeric, dimeric, and trimeric forms containing respectively one, two, or three fat acid units. Hence the insoluble nature of these gels is probably in part due to the tri-functional nature of the glycerol, this tri-functional nature contributing to the formation of insoluble materials by virtue of its structure which permits cross-linking to form three-dimensional molecules. On the other hand the substitution of dihydric alcohols which are difunctional in nature does not so readily permit the formation of three dimensional insoluble gels.

The polymerization of unsaturated fat acid esters of dihydric alcohols would not yield insoluble products as readily as does the polymerization of the unsaturated fat acid esters of trihydric and other polyhydric alcohols. However, no oils containing such esters are known to occur in nature, nor has any commercial method been available for preparing them synthetically.

We have discovered that long chain polymerization products of very high molecular weight, which can be readily obtained by a relatively simple process comprising the reaction of the polymers of compounds containing radicals of unsaturated fat acids with dihydric alcohols, are converted to substances having enhanced industrial application and value by subjecting them to reaction with sulfur, or other vulcanizing agents under conditions described more fully herein.

The method of our invention comprises first converting compounds containing radicals of unsaturated fat acids, such as the free acids, their glycerides or their esters with monohydric alcohols, to the polymeric acids. These polymeric acids derived from monomers containing unsaturated acyl radicals can be obtained by various procedures. For instance fatty oils containing substantial amounts of glycerides of unsaturated acids, such as oils of the drying or semi-drying type may be polymerized in the usual manner, that is by thermal treatment in the presence or in the absence of suitable polymerization catalysts. The polymeric glycerides thus formed may then be converted to the polymeric acids for example by hydrolysis. Another procedure more suitable for the production of polymeric acids consists in subjecting the fatty oils to alcoholysis with monohydric alcohols such as methanol or ethanol thereby converting the glycerides of the unsaturated acids to the corresponding mono-esters. These mono-esters can then be polymerized yielding esters of polymeric acids, from which the free polymeric acids may be obtained by hydrolysis.

Still another procedure for the preparation of polymeric acids consists in producing the free unsaturated fat acids by hydrolysis of the fatty oils followed by polymerization of these acids. In the course of any of the above described procedures the polymeric acids may be further purified or fractionated by any suitable means such as distillation, crystallization or solvent extraction. The polymeric acids may also be subjected to hydrogenation, prior to condensation with dihydric alcohols.

The polymeric acids obtained by any of the foregoing methods are then reacted with dihydric alcohols such as ethylene glycol or diethylene glycol. The reaction products thus obtained are viscous substances having properties which make them valuable as components or as intermediate products in the manufacture of synthetic materials such as plastics, resins, plasticizers, adhesives, compositions of natural or synthetic rubber, and the like.

Furthermore, we have discovered that these esters of polymeric acids with dihydric alcohols can be converted to viscous or plastic rubber-like materials by reacting them with sulfur, tellurium, selenium, or compounds thereof, or with other vulcanizing or oxidizing agents. In the vulcanization process the operating conditions such as temperature, duration of the reaction, amount of vulcanizing agent, may vary within wide limits depending upon the starting materials and the desired properties of the final product.

Our invention may be further illustrated by the following descriptions of some of its embodiments:

A. Preparation of polymeric acid

*Ex. 1.*—1770 grams of corn oil (color, Gardner scale 3, iodine value 127) were heat polymerized at 285–295° C. for 48 hours while passing a current of carbon dioxide through the reaction mixture. The polymerized material was saponified and the free acids obtained were converted to methyl esters by known methods. The majority of volatile non-polymerized material was then removed from the reaction mixture by distillation under reduced pressure. 788 grams of distillation residue consisting essentially of esters of polymeric acids, were thus obtained. The polymerized acids were obtained by subjecting the distillation residue to saponification, yielding 743 grams of polymerized acids having the following properties: Iodine value: 95 (Wijs, one half hour).

Acid number_____ 154
Color, Gardner scale_____ 10

*Ex. 2.*—595 grams of methyl esters of corn oil acids obtained by methanolysis of corn oil were heat polymerized at 285–295° C. for 67 hours. The polymerization product (having an iodine value of 82, and a color 4) was subjected to distillation under reduced pressure to remove the non-polymerized material. The distillation residue, consisting essentially of polymerized esters weighed 214 grams and yielded upon saponification the polymerized acids having the following properties:

Color _____ 11
Saponification value_____ 160

*Ex. 3.*—1000 grams of corn oil were saponified yielding 830 grams of corn oil acids, which were polymerized by heating them to 290° C. for 16 hours. Most of the non-polymerized material was removed by vacuum distillation, yielding 356 grams of a residue consisting essentially of polymerized corn oil acids, having the following properties:

Acid number_____ 122
Iodine value_____ 109

*Ex. 4.*—34.8 kilos of corn oil were converted to methyl esters by refluxing with an equal volume of anhydrous methyl alcohol for 1.25 hrs. in the presence of 85 gms. of sodium methylate, a catalyst. After neutralization of the catalyst with 100 gms. acetic acid, the methanol was removed by distillation. The glycerin layer, which settled to the bottom, was then drawn off, after which the methyl esters were polymerized by heating 16 hours at 290°–320° C.

The monomeric methyl esters amounting to 15.8 kilos were then removed by distillation under a vacuum of 5–20 mm. Hg.; leaving a total of 17.7 kilos of polymer in the kettle.

This residual polymer had the following properties:

Saponification value_____ 187
Color, Gardner scale_____ 12
Iodine value_____ 73

The residual polymer was then subjected to further purification by short path distillation in a high vacuum. In this manner a fraction consisting of 615 gms. of light yellow distillate was isolated from 1564 gms. of the residual polymer; this fraction consisted of very pure dimeric esters. The dimeric acids were obtained from the esters by saponification in a manner similar to that described above.

B. Preparation of polymeric esters of dihydric alcohols

*Ex. 5.*—386 grams of polymerized acid obtained according to the procedure described in Example 2 and 35.5 grams of ethylene glycol were heated first to 100° C. for 4 hours, then to 160° C. for 13 hours, then to 200° C. for 2 hours, and finally the reaction mixture was maintained at 150° C. for one half hour under a reduced pressure of 5 mm. mercury.

The acidic polyester thus obtained was a highly viscous, tacky liquid soluble in chloroform, having an acid number of 26.2 and a molecular weight of 4070 (as determined by the molecular depression in benzene).

*Ex. 6.*—221 grams of polymerized acids obtained according to the procedures described under section A and 31 grams of ethylene glycol were heated while passing a current of carbon dioxide through the reaction mixture. The temperature was maintained at 160–180° for 12 hours, then at 190–200° for 31 hours. Four grams of polymerized acids were then added to the reaction products, and the contents of the vessel were heated to 220° C. for ½ hour under a vacuum of 10 mm. mercury. 250 grams of polyesters were thus obtained in the form of a highly viscous liquid material, soluble in chloroform, having an acid number of 1.47 and a molecular weight of about 3500 (as determined by molecular depression in benzene).

*Ex. 7.*—58 grams of corn oil acids (having an iodine value, 152 from which most of the saturated acids and some of the oleic acid was removed by crystallization and containing substantial amounts of octadecadienoic acid), and 6 grams of ethylene glycol were heated first to 100° C. under 200 mm. mercury vacuum for 3 hours, and then to 200° C. under 5 mm. vacuum for 1 hour.

The ester thus obtained had an acid number of 6.3 and was similar in other properties to the products of Examples 5 and 6 after thermal polymerization for 20 hours at 290° C.

*Ex. 8.*—600 grams of dimeric, dibasic acid obtained according to the procedures described under Example 4 and 5 grams of ethylene glycol were treated as in Example 6 except that the heating period at 190-200° C. was increased to 120 hours. A polymeric polyester was obtained which exhibited properties similar to those of the polyesters described above.

C. Vulcanization

Products varying in their properties from extremely tacky, liquid, soluble substances to elastic, solid, insoluble materials can be obtained by the sulfurization of the polyesters described above under varying conditions.

*Ex. 9.*—11 grams of acidic polyesters obtained according to the procedure of Example 4 were mixed with 0.113 gram of sulfur and heated first to 125–130° C. for one hour and then to 135° for 10 minutes.

The reaction product was a thick viscous liquid, having a dark amber coloration and readily soluble in chloroform.

*Ex. 10.*—27.7 grams of neutral polyesters obtained according to Example 5, 0.805 gram of sulfur and 0.160 gram of tetramethyl thiuram disulfide were mixed at 110° C. and heated to 150° C. for two hours. A solid, elastic product was thus obtained.

*Ex. 11.*—37 grams of a 28 percent solution of the polyesters in benzene and 0.33 gram of sulfur monochloride were mixed with vigorous agitation, and the stirring was continued for some time. Evolution of heat took place and the mixture became viscous. The reaction product was treated with hot water and the benzene was removed by distillation. The distillation residue was a slightly tacky elastic solid.

*Ex. 12.*—A mixture containing three parts of polyester to one part of rubber hydrocarbon was prepared by dissolving the components in benzene, and vulcanized with $S_2Cl_2$ in known manner. The product thus obtained was an elastic solid similar to that obtained from pure rubber.

*Ex. 13.*—25 grams of polyester as described in Example 8, 11.5 grams sulfur, 1.5 grams zinc oxide and .34 gram mercaptobenzothiazole were mixed and the mixture vulcanized at 150° C. for 3 hours. The product was an elastic, rubber-like material.

In the foregoing examples the method of our invention is illustrated as applied to polymeric acids derived from constituents of corn oil, using ethylene glycol as the dihydric alcohol. Similar products are obtained by analogous procedures from the polymerizable constituents of other fatty oils containing substantial amounts of glycerides of octadecadienoic or octadecatrienoic acids, such as tung oil, dehydrated castor oil, peanut, cottonseed, wheat, soybean, linseed, Perilla oil and the like. Furthermore, in carrying out the process of our invention ethylene glycol may be replaced by other dihydric alcohols, such as diethylene glycol, tetramethylene glycol, decamethylene glycol, propylene glycol, 2,3-butylene glycol, and the like.

Having thus described our invention, what we claim for Letters Patent is:

1. The method of producing high polymers, which comprises vulcanizing dihydric alcohol polyesters of polymeric acids derived from monomers containing unsaturated acyl radicals containing at least two double bonds.

2. The method of producing high polymers, which comprises vulcanizing dihydric alcohol polyesters of polymeric acids obtained by thermal polymerization in the presence of a polymerization catalyst of monomers containing unsaturated acyl radicals containing at least two double bonds.

3. The method of producing high polymers, which comprises vulcanizing dihydric alcohol polyesters of polymeric acids derived from monomers containing unsaturated acyl radicals, said acyl radicals being radicals of fatty acids present, in the form of their glycerides, in natural vegetable oils.

4. The method of producing high polymers, which comprises vulcanizing dihydric alcohol polyesters of polymeric acids derived from monomers containing radicals of octadecadienoic acids.

5. The method of producing high polymers, which comprises vulcanizing dihydric alcohol polyesters of polymeric acids derived from monomers containing radicals of octadecatrienoic acids.

6. A process, as defined in claim 1, in which the dihydric alcohol polyesters are polyesters of ethylene glycol.

7. A process, as defined in claim 1, in which the vulcanization is effected in the presence of 0.1–22 percent sulfur.

8. A composition of matter consisting of high polymers produced by vulcanization of dihydric alcohol polyesters of polymeric acids derived from monomers containing unsaturated acyl radicals containing at least two double bonds.

JOHN C. COWAN.
WALDO C. AULT.